(12) United States Patent
Loader et al.

(10) Patent No.: US 7,436,769 B2
(45) Date of Patent: Oct. 14, 2008

(54) METHOD OF THROTTLING DATA FLOW THROUGH A ROUTER

(75) Inventors: Catherine Rachael Loader, Middlesex, NJ (US); Subhabrata Bapi Sen, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 979 days.

(21) Appl. No.: 10/153,030

(22) Filed: May 23, 2002

(65) Prior Publication Data

US 2003/0218987 A1  Nov. 27, 2003

(51) Int. Cl.
*H04J 1/16* (2006.01)
(52) U.S. Cl. .................. 370/235; 370/252
(58) Field of Classification Search .............. None
See application file for complete search history.

(56) References Cited

U.S. PATENT DOCUMENTS

| | | | |
|---|---|---|---|
| 4,974,256 A | | 11/1990 | Cyr et al. |
| 5,541,912 A | * | 7/1996 | Choudhury et al. ......... 370/412 |
| 5,675,742 A | * | 10/1997 | Jain et al. .................... 709/226 |
| 5,784,358 A | * | 7/1998 | Smith et al. ................. 370/230 |
| 6,252,950 B1 | * | 6/2001 | Duty et al. ................... 379/111 |
| 6,363,319 B1 | * | 3/2002 | Hsu ............................. 370/351 |
| 6,493,317 B1 | * | 12/2002 | Ma .............................. 370/237 |
| 6,594,268 B1 | * | 7/2003 | Aukia et al. ................. 370/400 |
| 6,700,869 B1 | * | 3/2004 | Falco et al. .................. 370/230 |
| 6,981,052 B1 | * | 12/2005 | Cheriton ...................... 709/232 |
| 6,990,073 B1 | * | 1/2006 | Sandoval ..................... 370/232 |
| 7,058,027 B1 | * | 6/2006 | Alessi et al. .............. 370/310.1 |
| 2002/0044557 A1 | * | 4/2002 | Isoyama ................. 370/395.42 |
| 2002/0110129 A1 | * | 8/2002 | Matsuoka et al. ....... 370/395.42 |
| 2002/0143981 A1 | * | 10/2002 | DeLima et al. .............. 709/233 |
| 2003/0003921 A1 | * | 1/2003 | Laakso ......................... 455/453 |
| 2003/0142651 A1 | * | 7/2003 | Matta et al. .................. 370/338 |
| 2006/0239283 A1 | * | 10/2006 | Fitzgerald .................... 370/401 |

OTHER PUBLICATIONS

S. Kasera, et al., "Fast and Robust Signaling Overload Control", pp. 1-24, Proceedings of INCP 9, 2001.

* cited by examiner

*Primary Examiner*—Andrew Lee

(57) ABSTRACT

In the method of throttling data flow through a router, a load parameter, which represents allowable load on the router, is determined and a state of overload control determined based on the load parameter. Overload control mechanisms associated with the determined state are then implemented. One of the overload control mechanisms throttles data that will flow through a router based on a priority class of the data.

16 Claims, 2 Drawing Sheets

METHOD OF THROTTLING DATA FLOW THROUGH A ROUTER

BACKGROUND OF THE INVENTION

1. Field of the Invention

The present invention relates to routing data, and more particularly, a method of throttling data flow through a router.

2. Description of Related Art

Excessive data can create overload and outage of a router as seen in the case of a Line Interface Unit (LIU), which is a message router in the cell of a wireless network. Existing overload control schemes treat all data, even data of differing types, the same. As such data is assumed to arrive at a router at a certain rate and get processed at a certain rate. In the more practical case, there are several classes or types of events or data, e.g., different types of messages in the case of message router in the cell of a wireless network. The different types of data tend to arrive at different rates and get processed at different rates. However, by treating different data types the same, the overload control mechanism may indiscriminately shed more important types of data and pass less important types of data. Additionally, a particular type of data may be more responsible for overloading the router than another type of data. As such, treating the different data types the same also means designing the router and overload control mechanisms for the worst case data type. Consequently, even when such overload mechanisms are used, router sizes have to be expanded unnecessarily to accommodate rare case of load surge in order to maintain a desired level of service; thus making the overall system that includes the router very costly.

SUMMARY OF THE INVENTION

The method of throttling data flow through a router according to the present invention is an adaptive maximizing scheme that rejects data increasingly with increasing amount of overload and at the same time rejects data in different proportions depending on their importance (priority class) to carrying the intended throughput, e.g., voice traffic in a wireless network. This throughput adaptive maximizing scheme for router overload control is applicable to many situations, especially in the communication industry and is quite unique in handling uncertainty of traffic flow pattern. This approach not only maximizes throughput but it protects the router hence the system, e.g., cell, from sudden surge of traffic load that is becoming very common in many situations like the demand for wireless service during a sports event in a stadium, traffic accident, etc.

In one aspect of the method, throttling data that will flow through a router is based on a priority class of the data. Specifically, the data is throttled based on a throttling parameter and a throttling threshold associated with the priority class of the data. The throttling parameter represents a desired level of throttling for the router. This aspect of the method further includes updating the throttling parameter based on whether the data was throttled and a type of the data. More specifically, the updating is based on whether the data was throttled, a load parameter representing allowable load on the router and a cost of router resources for processing the type of data. The load parameter is determined based on an average occupancy of router resources, a target occupancy of router resources, and a previous load parameter.

In another aspect of the method, data flow through a router is throttled by determining a load parameter representing allowable load on the router, determining a state of overload control based on the load parameter, and implementing overload control mechanisms associated with the determined state. The states of overload control include at least first and second states of overload control, wherein a greater reduction in load on the router is achieved in the second state than in the first state.

In a wireless network, for example, the first state includes the overload control mechanisms of extending an interval at which registration messages are output to the router is implemented and throttling data for output to the router based on a priority class of the data. These two overload control mechanisms are also associated with the second state, but the second state includes the additional overload control mechanism of extending an interval between sending messages including measurements used for determining whether to handoff a call.

BRIEF DESCRIPTION OF THE DRAWINGS

The present invention will become more fully understood from the detailed description given below and the accompanying drawings, wherein like elements are represented by like reference numerals, which are given by way of illustration only and thus are not limitative of the present invention and wherein.

DETAILED DESCRIPTION OF THE INVENTION

Figure 1:
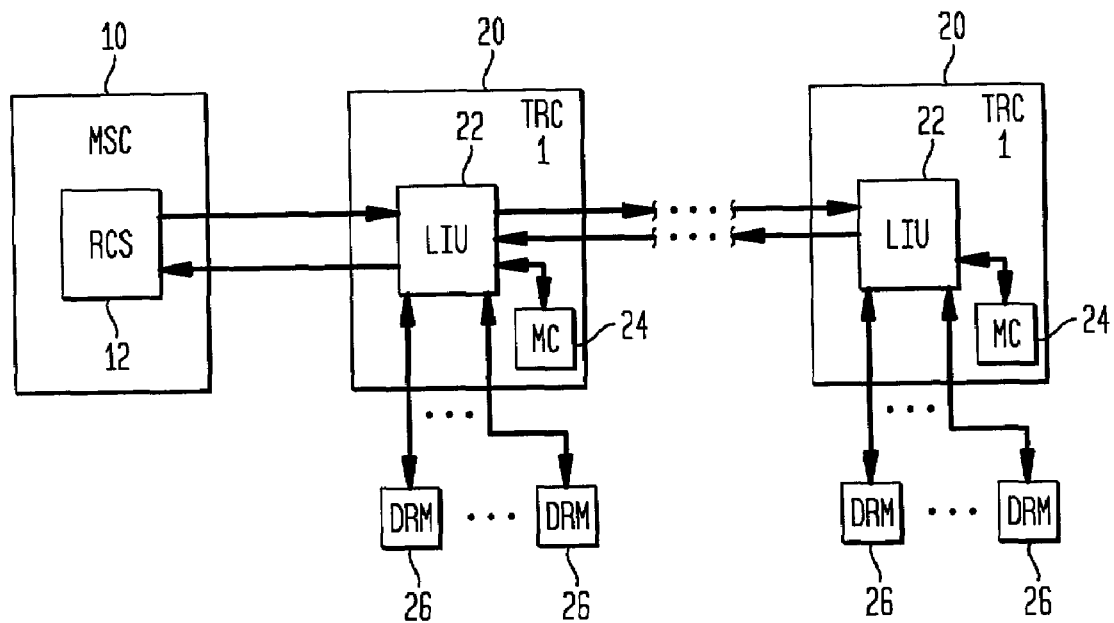
FIG. 1 illustrates a portion of a conventional wireless network.

The method of throttling data flowing through a network according to the present invention is applicable to any data network handling data that can be classified into different types, classes, events, etc. Therefore, for the sake of description only, the method according to the present invention will be described as implemented in a conventional wireless network such as shown in FIG. 1. Furthermore, as used in this application, the term throttling, such as in the phrase throttling data flowing the router, should be interpreted as controlling (e.g., decreasing or increasing) the data flowing through the router.

Wireless Network Architecture

As shown in FIG. 1, N TDMA (time division multiple access) Radio Controllers (TRCs) 20 are connected in a daisy chain configuration with a mobile switching center (MSC) 10. The MSC 10 includes a radio control server (RCS) 12 that controls the flow of downlink messages to the TRCs 20 and the receipt of uplink messages from the TRCs 20. In describing the implementation of the method in a wireless network, the data flowing through a router of the wireless network will be referred to as messages, and the router (as will be seen below) will be referred to as a message router.

Each TRC 20 includes a message router 22 (referred to in at least one wireless standard as a Line Interface Unit). The message router 22 routes messages to a Main Controller (MC) 24 in the TRC 20 and to the Dual Radio Modules (DRMs) 26, e.g., cell sites, served by the TRC 20. The message router 22 also routes messages issued by the MC 24 and the DRMs 26. In addition, a message router 22 passes messages destined for downlink TRCs 20 to the next downlink TRC 20 in the daisy chain, and routes messages destined for uplink TRCs 20 or the RCS 12 to the next uplink TRC 20 or the RCS 12.

Throttling Methodology

Figure 2:
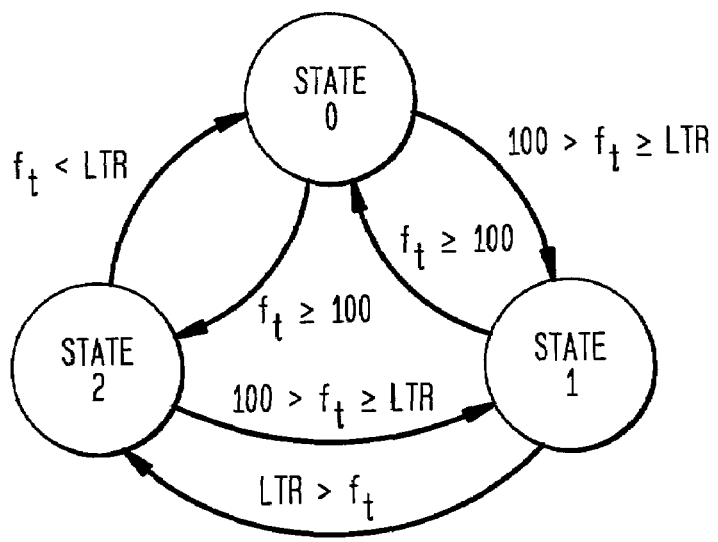
FIG. 2 illustrates a state diagram implemented in the wireless network when employing the method according to the present invention.

The throttling methodology according to the present invention is a distributed process implemented at those elements generating data that will flow through the router. In the embodiment of FIG. 1, this distributed process is implemented in part by the RCS 12 and in part by the DRMs 26, which both generate messages that will flow through a message router 22. The throttling performed according to the methodology depends on the state of the router. FIG. 2 illustrates a state diagram for implementing the methodology of the present invention.

As shown, the state of the message router 22 depends on a load parameter $f_t$ that represents the allowable load on the message router 22. Specifically, $f_t$ represents the fraction of load allowed at time t on the message router 22, and is derived according to the following expression:

$$f_t = \max(FMIN, \min((TPO/APO)^* f_{t-1}, 100)))$$

where FMIN is the minimum value of $f_t$ so that the data flow to the router returns to normal quickly when overload conditions cease; TPO is the target processor occupancy (processor occupancy is the occupancy of the processing resources of the router); APO is the average processor occupancy, which derived by averaging three instantaneous measurements of the processor occupancy taken at a 10 second interval over a moving 30 second measurement window (however, the present invention should not be viewed as limited to this averaging scheme); and $f_t$ is the previously determined load parameter.

Referring to FIG. 2, in state 0, no overload control is performed. State 0 is achieve when $f_t$ is greater than or equal to 100. If $f_t$ drops below 100, but is greater than a predetermined full overload control threshold LTR, state 1 is achieved. In state 1, less than all of the available overload control mechanisms are implemented, and/or a weaker version of the overload control mechanisms are implemented. For example, in the wireless network of FIG. 1, in state 1 the DRMs 26 associated with the message router 22 in overload implement an extended registration interval and the RCS 12 implements a priority class based adaptive message throttling methodology. Both of these overload techniques are described in greater detail below.

If $f_t$ is less than LTR, then state 2 is achieved, and greater degree of overload control is performed. In the wireless network implementation, the same overload control mechanisms as in state 1 are performed. Additionally, in state 2, the DRMs 26 associated with the overloaded message router 22 implement an extended handoff measurement reporting interval discussed in more detail below.

Figure 3:
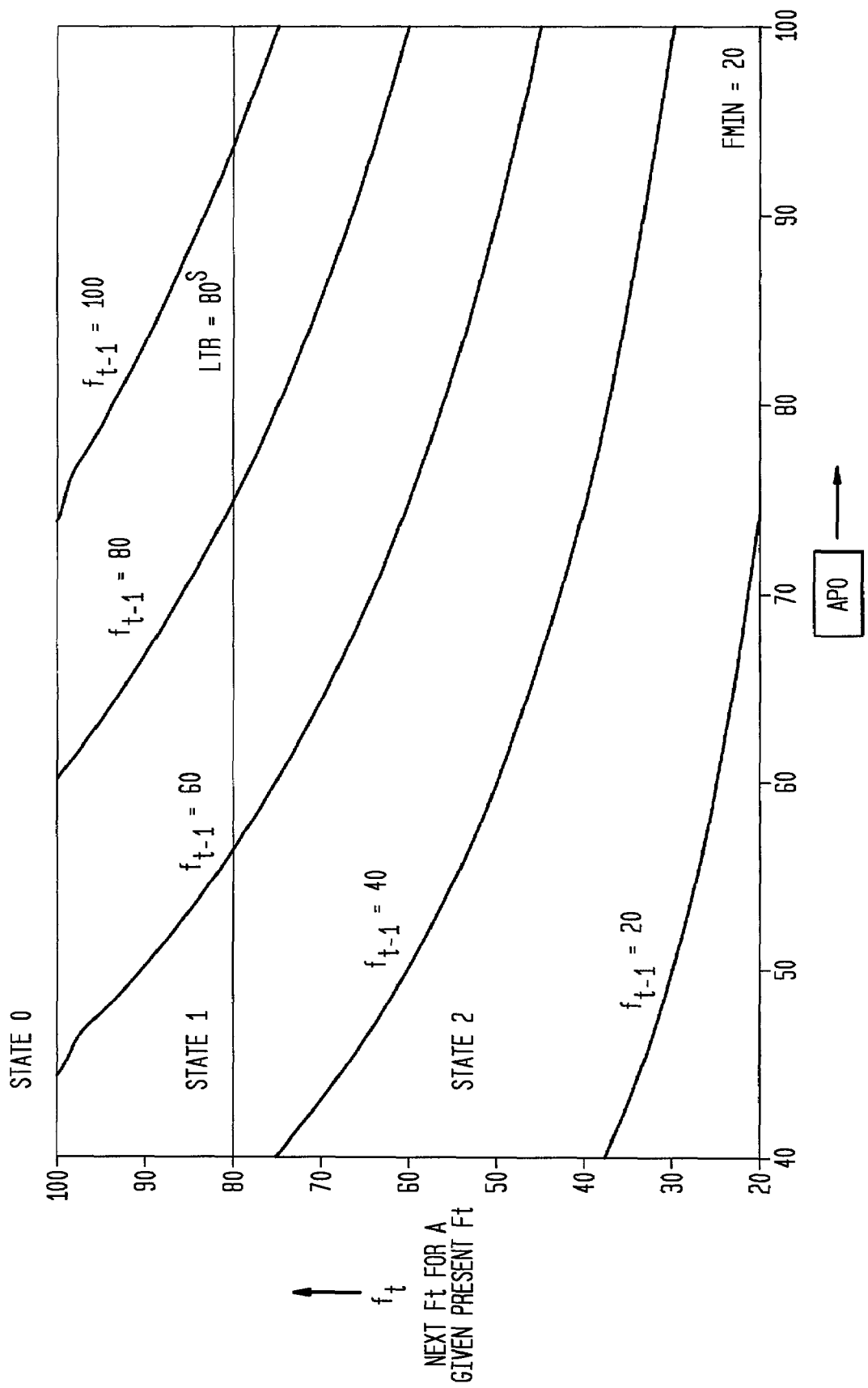
FIG. 3 illustrates the relationship between fraction allowed at time t and average processor occupancy (APO) for two different target processor occupancies.

FIG. 3 illustrates the relationship between the load parameter $f_t$ at time t and average processor occupancy (APO) for a different target processor occupancy.

It will be appreciated that depending on the router (e.g., message router, IP data packet router, etc.) for which the methodology the present invention is implemented, more states could be added with varying degrees of overload control. It will further be appreciated that the varying degrees of overload control can be accomplished by the addition of overload control mechanisms and/or the strengthening of overload control mechanisms.

Next, the three specifically mentioned overload control mechanisms for a wireless next work will be described in more detail.

Extend Registration Interval

The DRMs 26 generate periodic messages called autonomous registration (AR) messages. An AR message from a DRM 26 reports on the mobile stations that have registered with the DRM 26. The DRM 26 sends the AR message to the RCS 12. In state 1, the interval between sending AR messages to the RCS 12 is increased by the DRMs 26 associated with the message router 22 in overload. Because the AR messages are less critical to overall network operation, more message router capacity is available for more important types of messages.

Adaptive Message Throttling

As discussed above, in state 1, the RCS 12 implements an adaptive message throttling based on the priority class of the message. The various types of messages generated by the RCS 12 that will be routed through a message router 22 are classified based on a policy set forth by the wireless network operator (e.g., maximize throughput, minimize dropped calls, etc.) Table 1 below demonstrates an example of message types generated by the RCS 12 for routing through a message router 22, and the assigned priority class. Table 1 further illustrates the cost, in terms of processing time at the message router 22, if the message is sent. Table 1 still further illustrates a critical value used in determining whether to throttle a message as discussed in greater detail below. The types of messages, the priority classes assigned and the critical values set have been chosen under a policy of attempting to maintain system integrity under overload conditions and to maximize system capacity (revenue generating services) under overload conditions. As will be further appreciated, these same policy considerations were the basis for establishing the overload controls in states 1 and 2 for the methodology of the present invention implemented in the wireless network of FIG. 1.

| Message Type | Priority Class (p) | Cost (C) Milli Second | Critical Value ($CV_P$) |
|---|---|---|---|
| RMDPAGE (digital page) | 1 | 10.3 | 0 |
| RMPAGE (analog page) | | 9.7 | |
| RMDCCHMSG (SMS) | 1 | 10.5 | |
| RMDLOCREQ (down) | 2 | 10.1 + 15.6 = | −300000 |
| RMDLOCRPY (up) | | 25.7 | |
| RMLOCREQ (down) | 3 | 10.7 + 15.4 = | −500000 |
| RMLOCRPY (up) | | 26.2 | |

In Table 1, RMDPAGE represents a page message used in setting up a call when operating according to a digital wireless technology, RMPAGE represents a page message used in setting up a call when operating according to an analog wireless technology, RMDCCHMSG represents a message for supplying an SMS (short message service) message, RMDLOCREQ represents a locate request message used when handing in a call according to a digital wireless technology, RMDLOCRPY represents a locate reply message used when handing in a call according to a digital wireless technology, RMLOCREQ represents a locate request message used when handing in a call according to an analog wireless technology, and RMLOCRPY represents a locate reply message used when handing in a call according to an analog wireless technology.

Next the throttling process will be described. Throttling is based on a throttling parameter $R_n$, which measures the deviation of intended message throttling from actual message throttling when the nth throttle-able message arrives. First, the throttling parameter $R_n$, is compared to the critical value $CV_p$ for the (n+1)th message. If $R_n < CV_p$, then the (n+1)th message is rejected (i.e., not output from the RCS 12). However, if $R_n$ is not less than $CV_p$, then the message is accepted (i.e., output by the RCS 12).

After this decision process, the throttling parameter is updated according to the following expression:

$$R_{n+1} = R_n + fa_t * C_{n+1} \text{ if } (n+1)\text{th message is rejected}$$

$$R_{n+1} = R_n - (100 - fa_t) * C_{n+1} \text{ if } n+1 \text{ message is accepted}$$

where $fa_t=\max((100-K*(100-f_t)), \text{FMIN})$, and where K is a system designer chosen constant (e.g., K=1.4).

The effect of setting classifications and critical values according to TABLE 1 is to, in order of impact: degrade acceptance of new calls by throttling of analog and digital pages and throttle SMS messages; degrade digital call quality by reducing hand-in due to throttling of RMDLOCREQ and RMDLOCRPY (done by mobile measurement); and more severely degrade analog call quality by reducing hand-in due to throttling of RMLOCREQ and RMLOCRPY.

To better understand the operation of the throttling methodology, consider the following example:

Using $f_t=83$, K=1.4

Adjusted $fa_t$ becomes 76.2

Suppose $R_n=350000$ then if the next message is
RMDPAGE: $-350000<0$ Reject Page, $R_{n+1}=-350000+76.2*10.3=-349215$
RMDLOCREQ: $-350000<-300000$ Reject RMDLOCREQ, $R_{n+1}=-350000+76.2*25.7=-348041.66$
RMLOCREQ: $-350000>-500000$ Accept RMLOCREQ, $R_{n+1}=-350000-(100-76.2)*26.2=-350623.56$ As will be appreciated, the decision of whether to throttle a message is based on the throttling parameter $R_n$ and the throttling threshold $CV_p$ associated with a priority class of the message. As will be further appreciated, the throttling parameter $R_n$ is updated based on whether the message is throttled (i.e., rejected) or not (i.e., accepted and sent to the message router 22). Furthermore, the adjustment to the throttling parameter $R_n$ varies depending on the cost C in terms of processing resources of the message router 22 and the load parameter $f_t$.

Extend Handoff Measurement Reporting Interval

The DRMs 26 generate periodic messages supplying measurements used to determine whether a call should be handed off from one DRM 26 to another DRM 26. The DRM 26 sends the measurement message to the RCS 12. In state 2, the interval between sending such measurement messages to the RCS 12 is increased by the DRMs 26 associated with the message router 22 in overload.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of throttling data flow to a router, comprising:
throttling data that will flow through a router based on a priority class of the data; and
updating the throttling parameter based on whether the data was throttled and a cost of router resources for processing a type of data,
wherein the throttling step throttles the data based on a comparison of a throttling parameter to a throttling threshold associated with a priority class of the data, the throttling parameter representing a desired level of throttling for the router, and the throttling parameter being a deviation of actual throttling from desired throttling.

2. The method of claim 1, further comprising: wherein the updating also updates the throttling parameter based on the type of data.

3. The method of claim 1, wherein the updating also updates the throttling parameter based on a load parameter representing allowable load on the router.

4. The method of claim 3, further comprising:
determining the load parameter based on an average occupancy of router resources, a target occupancy of router resources, and a previous load parameter.

5. The method of claim 1, wherein the data is a message in a wireless communication system.

6. The method of claim 1, wherein a cost of router resources is based upon the processing time and the type of data.

7. A method of throttling data flow to a router, comprising:
determining a load parameter representing allowable load on the router based on an average occupancy of router resources, a target occupancy of router resources, and a previous load parameter;
determining a state of overload control based on the load parameter; and
implementing overload control mechanisms associated with the determined state, the overload control mechanisms including at least extending an interval at which messages are output to the router, the messages being one of messages supplying measurements used to determine whether a call should be handed off and registration messages.

8. The method of claim 7, wherein the states of overload control include at least first and second states of overload control, a greater reduction in load on the router being achieved in the second state than in the first state.

9. The method of claim 7, further comprising:
determining the average occupancy of the router resources by averaging a moving window of instantaneous occupancy measurements taken at a predetermined interval.

10. The method of claim 8, wherein the overload control mechanism of extending an interval at which registration messages are output to the router is implemented in the first state.

11. The method of claim 8, wherein an overload control mechanism of throttling a data for output to the router based on a priority class of the data is implemented in the first state.

12. The method of claim 8, wherein a first overload control mechanism of extending an interval at which registration messages are output to the router is implemented in the first state, and a second overload control mechanism of throttling a data for output to the router based on a priority class of the data is implemented in the first state.

13. The method of claim 11, wherein the first and second overload control mechanisms are associated with the second state, and a third overload control mechanism of extending an interval between sending messages including measurements used for determining whether to handoff a call is implemented in the second state.

14. The method of claim 12, wherein the determining step determines the load parameter based on an average occupancy of router resources, a target occupancy of router resources, and a previous load parameter.

15. The method of claim 8, wherein a first overload control mechanism of extending an interval between sending messages including measurements used for determining whether to handoff a call is implemented in the second state.

16. The method of claim 14, wherein a second overload control mechanism of extending an interval at which registration messages are output to the router is implemented in the second state, and a third overload control mechanism of throttling a data for output to the router based on a priority class of the data is implemented in the second state.

* * * * *